UNITED STATES PATENT OFFICE.

JAMES H. GRAVELL, OF PHILADELPHIA, PENNSYLVANIA.

METHOD OF PREPARING METAL FOR PAINTING.

1,211,138.

Specification of Letters Patent.

Patented Jan. 2, 1917.

No Drawing.

Application filed July 22, 1916. Serial No. 110,690.

*To all whom it may concern:*

Be it known that I, JAMES H. GRAVELL, a citizen of the United States, and a resident of Philadelphia, in the county of Philadelphia and State of Pennsylvania, have invented a certain new and useful Method of Preparing Metal for Painting, of which the following is a specification.

This invention relates to cleaning metals of the iron class, such as steel, and one of its objects is the rapid, easy and commercial preparation of the surface of the metal for the reception of paint in such a way that the surface will not rust under the paint or in any way deleteriously affect the paint or its serviceability.

Phosphoric acid is an example of an acid which when applied to iron or steel produces salts insoluble in water and a solution of it is well adapted for use in the preparation of metals of the iron class for painting.

A weak solution of phosphoric acid is not suitable for commercial work because it takes too long to act and requires a number of applications; and a strong solution is not, more particularly in the case of large surfaces, suitable because there is a tendency to thicken and become sticky and even dry on the surface, so that it cannot be wiped off and remaining, will cause applied paint soon to show serious defects due to pealing, cracking and the like.

I have discovered that by initially applying a strong solution, and then doing the necessary removal in the presence of a relatively weak solution, that excellent and successful commercial results are readily produced, even by unskilled labor and upon large surfaces.

The presence of a weak solution during the removal operation is important, because the products of the reaction of the strong solution, are more soluble in or removable by a weak acid solution than they are in the solvent of the acid alone. The free or uncombined acid resulting from the initial use of a strong solution is a source from which the weak solution may be obtained by the application to the surface of a suitable solvent alone; or a weak acid solution may be applied instead of the solvent alone.

It will be understood that some of the results of the strong acid solution are to leave on the surface objectionable matter such as grease, salts, and an excess of free strong acid, which if allowed to remain there would deleteriously affect an applied coating of paint, and the gist of the present invention is to provide for removing sufficient of these substances to provide for successful painting, and according to the present invention this is done by re-dissolving and removing the substances by means of a comparatively weak acid solution, the acidity of which may be derived either by adding a small quantity of acid to the solution or by re-dissolving the acid on the surface, or by a combination of both methods.

My process as carried out commercially, consists in applying a relatively strong solution of phosphoric acid, consisting of one part of 85% solution of ortho-phosphoric acid to about 5 parts of a solvent (by volume); to the metallic surface; by means of a brush or sponge, or it may be applied in the form of a spray by an atomizer; it is then allowed sufficient time to act on the surface—five minutes being usually sufficient. The surface is then washed down with a dilute solution of the acid consisting of 1 part of 85% solution of ortho phosphoric acid to about 20 parts of solvent (by volume). This is usually sufficient to make a clean surface but in some special cases where the rust has become deeply embedded, it will be found necessary to apply emery cloth locally to the rusted spot during the washing operation. After washing the surface clean, it is wiped dry with a chamois. The surface will then air dry in about fifteen minutes and be ready for painting.

The process as I have described it may be altered to suit various conditions without departing from principles of the invention. For instance I may have my strong solution in the form of a bath and my washing solution in the form of a bath. Instead of using a chamois for drying, I may use an air blast or in case I make my washing solution hot, it will immediately evaporate from the surface and will require no drying agent. I may substitute the emery-cloth with any other means of abrasion properties. In case I wish to apply my washing solution in unlimited quantities such as would be the case in using a large bath or when applying it in a stream from a hose, I make up a solution as has already been described, but when the washing solution is applied in limited quantities as would be the case when applying it with a rag or sponge, I may form the washing solution directly on the metallic surface by applying a solvent such as water or alcohol in limited quantities so that the remaining portion of the strong solution still on the surface will enter into solution with the limited quantity of the simple solvent to form a weak solution of suitable proportions for washing.

The solvent used in my process is immaterial provided it will dissolve the phosphoric acid and not injure the metal. Either water or alcohol can be used to advantage. In case the steel is entirely free from substances of an oily nature, water is the best and cheapest solvent; if oil is present, alcohol or a similar solvent should be used. In carrying out my process commercially, I prefer to use denatured alcohol as the solvent in my strong solution as there is almost always oil present on the material under treatment; for my washing solvent I prefer to use water as the strong alcoholic solution takes care of what oil may be present.

Any of the three forms of phosphoric acid may be used—ortho, pyro, or meta, but the best and cheapest form is the ortho phosphoric acid.

The process as described is most suitable for preparing automobile bodies, steel furniture, interior finish and all those products manufactured from cold rolled steel, for painting.

Inasmuch as the invention is chemical in its nature I do not intend to limit the same so as to deprive myself of the full benefit of the application of the law of equivalents in such cases, by anything contained in the foregoing description or to in any way limit the invention other than as the claims and prior art may require.

What I claim is:

1. The method of cleaning metals of the iron class which consists in applying to the surface thereof a relatively strong solution of an acid which produces water insoluble salts, and after said relatively strong solution of acid has acted upon the surface of the metal subjecting the same to the action of a relatively weak solution of such acid, substantially as described.

2. The method of cleaning metals of the iron class which consists in applying to the surface thereof a relatively strong solution of phosphoric acid, and after said relatively strong solution of phosphoric acid has acted upon the surface of the metal subjecting the same to the action of a relatively weak solution of phosphoric acid.

3. The method of cleaning metals of the iron class which consists in applying to the surface thereof a relatively strong solution of phosphoric acid in excess, and after a portion of the acid of said relatively strong solution has cleaned the surface of the metal washing the same with a limited quantity of water which by re-dissolving the excess of acid forms a relatively weak solution of phosphoric acid and removes the products of the cleaning action of the strong solution.

4. The method of cleaning metals of the iron class which consists in applying to the surface thereof a relatively strong solution of phosphoric acid in water, and after said acid has exerted its cleaning action upon the surface of the metal washing the same with a limited quantity of water to form a weak solution of phosphoric acid and remove the products of the cleaning action of the strong solution.

5. The method of cleaning metals of the iron class which consists in applying to the surface thereof a relatively strong solution or admixture of alcohol and phosphoric acid, and after said acid has acted upon the surface of the metal washing the same with a limited quantity of water.

6. The method of cleaning metals of the iron class which consists in applying to the surface thereof a relatively strong solution of alcohol and phosphoric acid, and after said acid has acted upon the surface of the metal washing the same with a relatively weak solution of phosphoric acid and water, substantially as described.

7. The method of cleaning metal for painting which consists in applying a strong solution of alcohol and phosphoric acid to the surface thereof, allowing time for it to act on the metal and obnoxious substances on the surface of the metal, then washing the metal with a relatively weak solution of water and phosphoric acid, scrubbing the metal with emery cloth or the like while wet with the washing solution, and subsequently drying the metal.

JAMES H. GRAVELL.